(12) United States Patent
Chandan et al.

(10) Patent No.: US 9,709,966 B2
(45) Date of Patent: Jul. 18, 2017

(54) THERMO-ECONOMIC MODELING AND OPTIMIZATION OF A COMBINED COOLING, HEATING, AND POWER PLANT

(75) Inventors: Vikas Chandan, Karnataka (IN); Ioannis Akrotirianakis, Princeton, NJ (US); Amit Chakraborty, East Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 713 days.

(21) Appl. No.: 14/236,500

(22) PCT Filed: Aug. 17, 2012

(86) PCT No.: PCT/US2012/051262
§ 371 (c)(1),
(2), (4) Date: Apr. 15, 2014

(87) PCT Pub. No.: WO2013/025962
PCT Pub. Date: Feb. 21, 2013

(65) Prior Publication Data
US 2014/0229012 A1    Aug. 14, 2014

Related U.S. Application Data

(60) Provisional application No. 61/524,891, filed on Aug. 18, 2011.

(51) Int. Cl.
| | |
|---|---|
| *G01M 1/38* | (2006.01) |
| *G05B 13/00* | (2006.01) |
| *G05B 15/00* | (2006.01) |
| *G05D 23/00* | (2006.01) |
| *G05B 13/04* | (2006.01) |

(52) U.S. Cl.
CPC .......... *G05B 13/04* (2013.01); *G05B 13/042* (2013.01)

(58) Field of Classification Search
None
See application file for complete search history.

(56) References Cited

U.S. PATENT DOCUMENTS 5,963,458 A * 10/1999 Cascia ................. F25B 49/02
165/200
6,591,225 B1 * 7/2003 Adelman .............. F01K 23/10
700/32
(Continued)

FOREIGN PATENT DOCUMENTS

CN    102073272 A    5/2011

OTHER PUBLICATIONS

Andreassi et al, Optimal Management of Power Systems,Energy Management, Francisco Macia Perez, ISBN: 978-953-307-065-0, InTech, Mar. 2010, pp. 177-203.*
(Continued)

*Primary Examiner* — Diem Cao

(57) ABSTRACT

A method to manage operating costs of a combined cooling heating and power (CCHP) plant that includes converting complex models of underlying components of the plant into simplified models (S101), performing an optimization that uses the simplified models as constraints of the optimization to output at least one decision variable (S102), and adjusting controls of the plant based on one or more of the output decision variables (S103).

26 Claims, 11 Drawing Sheets

(56) References Cited

U.S. PATENT DOCUMENTS

| | | | |
|---|---|---|---|
| 2010/0332273 A1 | 12/2010 | Balasubramanian | |
| 2011/0066258 A1 | 3/2011 | Chakraborty | |
| 2011/0168159 A1* | 7/2011 | Lataperez | F24D 11/00 126/400 |
| 2012/0010757 A1* | 1/2012 | Francino | G05B 15/02 700/291 |
| 2012/0010758 A1* | 1/2012 | Francino | G05B 17/02 700/291 |
| 2012/0126608 A1* | 5/2012 | Chi | B60B 1/02 301/56 |

OTHER PUBLICATIONS

Mago et al, Analysis and optimization of CCHP systems based on energy, economical, and environmental considerations, Energy and Buildings 41, 2009, pp. 1099-1106.*

Report of Examination mailed May 31, 2016; Chinese Patent Application No. 201280040221.0; 52 pages.

Dong, Lei "The Study on Operational Optimization and Analysis Evaluation of CCHP System" Chinese Master's Theses, Engineering Science and Technology II, Issue 9, Dalian University of Technology, 2010.

International Search Report.

Mago, P.J. et al. "Analysis and optimization of CCHP systems based on energy, economical, and environmental considerations" Elsevier; Energy and Buildings, vol. 41, 2009.

Li Yun et al. "Integrated Optimization of Scheme and Operation Strategy for CCHP System" Journal of Power Engineering; vol. 26, No. 6; Dec. 31, 2006; 2006.

Liu Xiaodan "Optimization Operation of CCHP Systems" Chinese Master's Theses Full-text Database Engineering Science and Technology II, issue 5, 2008; 2008.

Wang Guiren "Study on the Change Law of Pressure in Low Temperature Vessel" Chinese Master's Theses Full-text Database Engineering Science and Technology II, issue 9; 2008; 2008.

Translation of Chinese Office Action mailed Sep. 23, 2015 corresponding to Chinese Application No. 201280040221.0 filed Aug. 17, 2012 (33 pages).

* cited by examiner

THERMO-ECONOMIC MODELING AND OPTIMIZATION OF A COMBINED COOLING, HEATING, AND POWER PLANT

CROSS-REFERENCE TO RELATED APPLICATIONS

This application claims priority to U.S. Provisional Application No. 61/524,891 filed on Aug. 18, 2011, the disclosure of which is incorporated by reference herein.

BACKGROUND OF THE INVENTION

1. Technical Field

The present disclosure relates generally to thermo-economic modeling and optimization of power plants, and more particularly, to thermo-economic modeling and optimization of a combined cooling, heating, and power plant.

2. Discussion of Related Art

Combined Cooling, Heating, and Power Plants (CCHP) are becoming increasingly popular in both residential and commercial sectors for meeting desired energy demands. Since these systems integrate cooling, heating and power generation capabilities at one site, they result in potentially lower capital costs. The presence of multiple energy sources which characterizes these systems also provides a significant potential for reducing energy consumption and greenhouse emissions.

A hierarchical paradigm including a supervisory control layer may be used to control such systems. The supervisory layer determines the set-points of important plant operation parameters such as component on/off states, water and gas temperatures, mass flow rates, etc.

However, it can be difficult to determine the set-points that would be most optimal for providing efficient plant operation. Detailed models for CCHP components are available. However, integration of such detailed models for plant-wide optimization may result in large computation times and other practical concerns related to implementation.

Thus, there is a need to develop reduced order models, which accurately capture important dependencies contained in the detailed models and also allow their use for efficient and robust optimization.

SUMMARY OF THE INVENTION

According to an exemplary embodiment of the invention, a method to manage operating costs of a combined cooling heating and power (CCHP) plant includes converting complex models of underlying components of the plant into simplified models, performing an optimization that uses the simplified models as constraints of the optimization to output multiple decision variables, and adjusting controls of the plant based on one or more of the output decision variables.

According to an exemplary embodiment of the invention, a Combined Cooling Heating Power (CCHP) Plant includes a cooling element, a heating element, a power supplying element, and a computer comprising a memory including a program, and a processor configured to execute the program. The program includes instructions to convert complex models of underlying components of the elements into simplified models, perform an optimization that uses the simplified models as constraints of the optimization to output decision variables, and adjust controls of at least one of the elements of the plant based on one or more of the output decision variables.

BRIEF DESCRIPTION OF THE DRAWINGS

Exemplary embodiments of the invention can be understood in more detail from the following descriptions taken in conjunction with the accompanying drawings in which.

DETAILED DESCRIPTION

Exemplary embodiments of the invention are discussed in further detail with reference to FIGS. 1-11. This invention may, however, be embodied in different forms and should not be construed as limited to the embodiments set forth herein.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
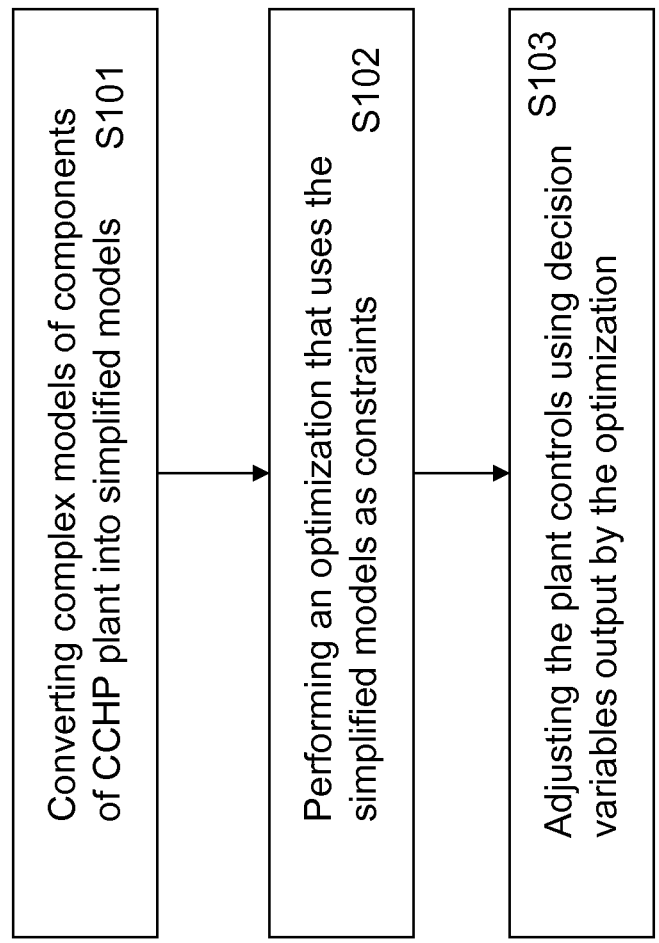
FIG. 1 illustrates a method of managing costs of a CCHP according to an exemplary embodiment of the invention.

FIG. 1 illustrates a method of optimizing performance of a combined heating, cooling, and power (CCHP) plant, according to an exemplary embodiment of the invention. The method includes converting complex models of underlying components of the plant into simplified models (S101), performing an optimization that uses the simplified models as constraints of the optimization to output multiple decision variables (S102), and adjusting plant controls using the output decision variables (S103).

Figure 2:
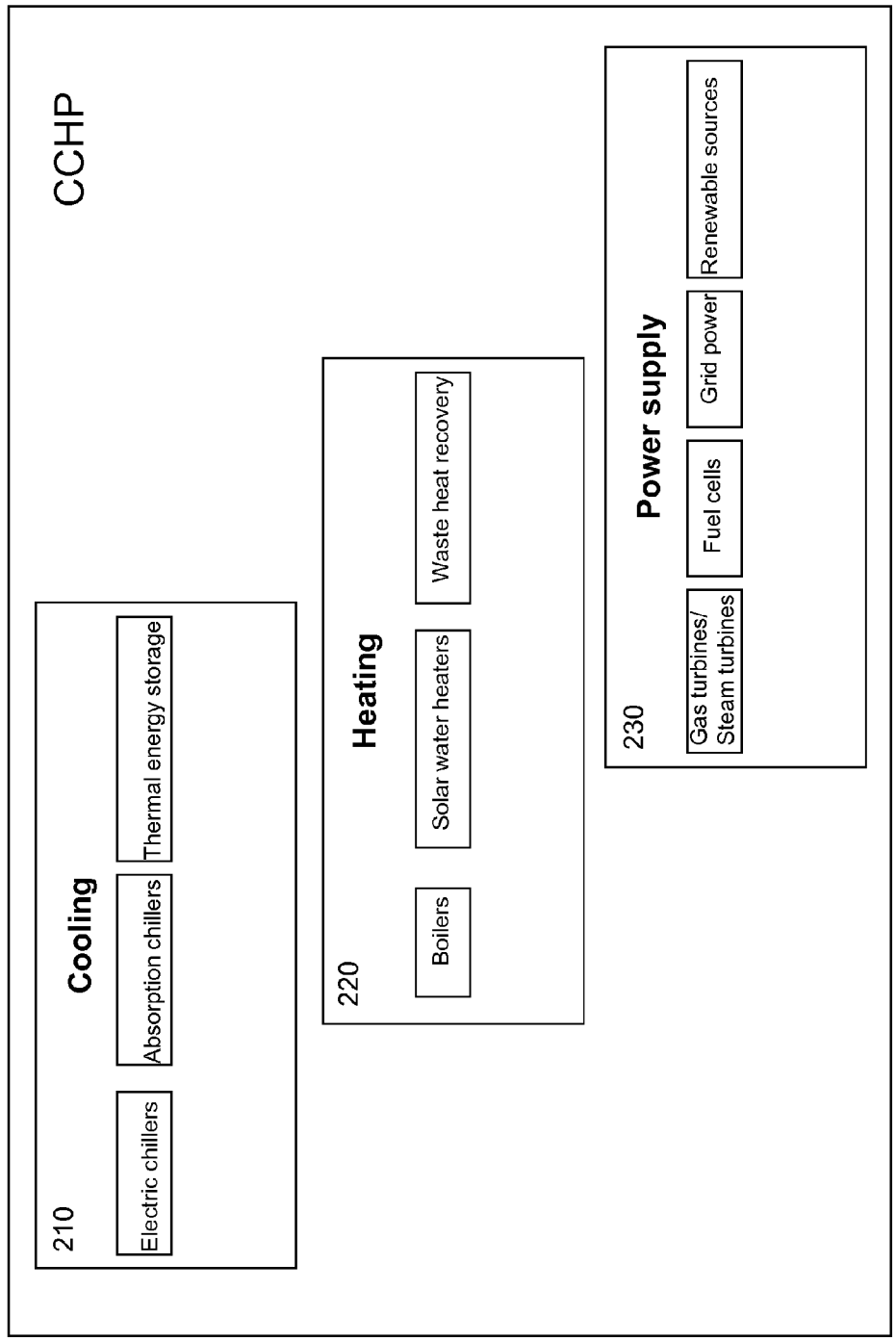
FIG. 2 illustrates a diagram of a CCHP.
Figure 3:
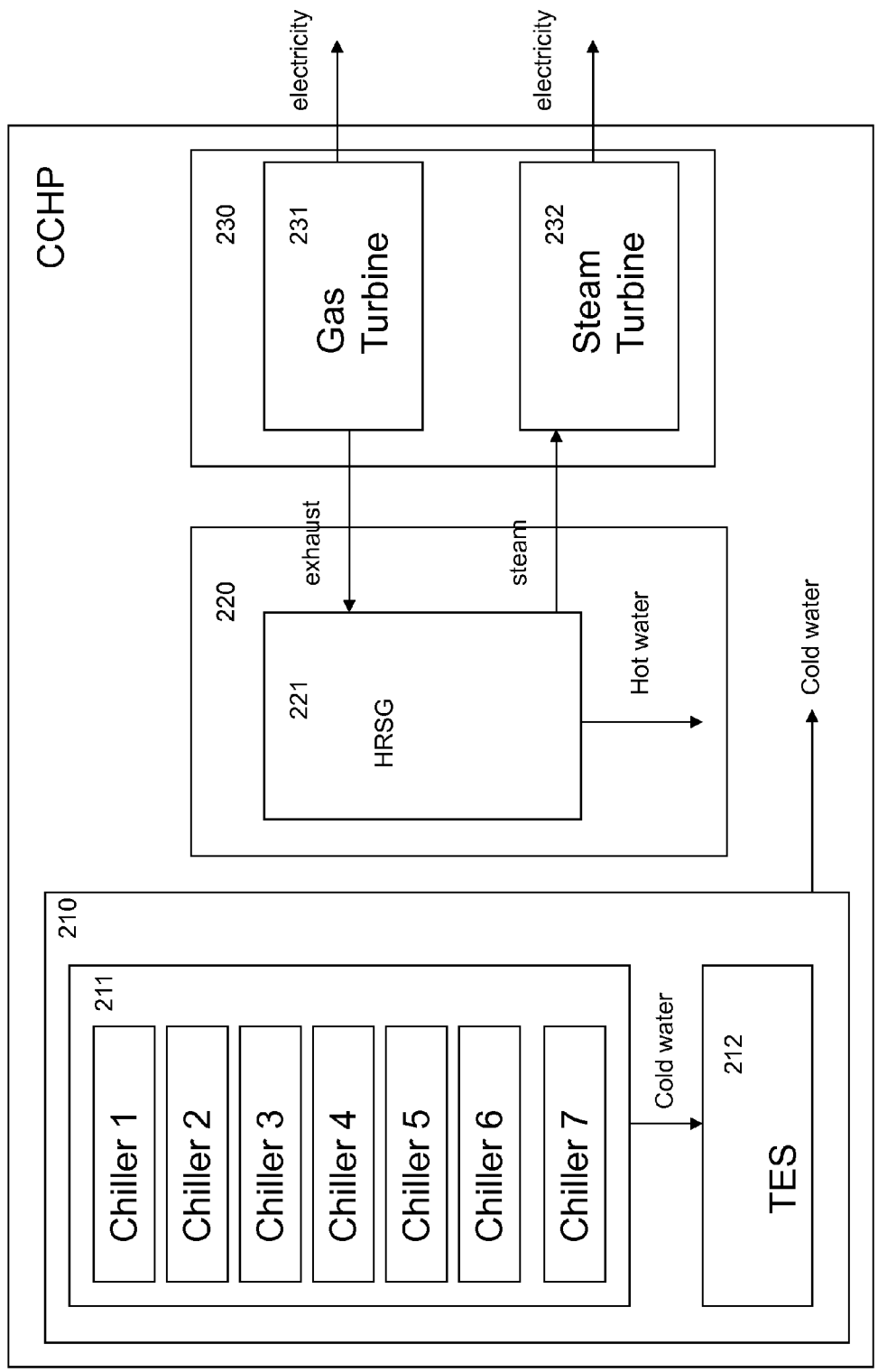
FIG. 3 illustrates an exemplary CCHP.

FIG. 2 illustrates an example of the CCHP plant including a cooling element 210, a heating element 220, and a power supply element 230. An exemplary embodiment of the CCHP plant is illustrated in FIG. 3. The CCHP plant includes seven electric chillers 211 that generate cold water (e.g., lowers temperature of water received) for cooling or for storage in a thermal energy storage (TES) tank 212. In an exemplary embodiment, the chillers 211 are electric chillers. The chillers 211 and the TES tank 212 form the source components of the cooling element 210 to meet cooling demands. The CCHP plant further includes a gas turbine 231 and a steam turbine 232 that provide electrical power. The thermodynamic energy of the exhaust from the gas turbine 231 is used to heat water in a Heat Recovery Steam Generator (HRSG) 221 to produce steam to drive the steam turbine 232 and hot water to provide heat. Thus, the gas turbine 231 and the steam turbine 232 form the source components of the power supply element 230 to meet power needs. The HRSG 221 or the HRSG 221 in combination with the gas turbine 231 may be considered the source components of the heating element 220 to meet the heating demands.

The CCHP plant illustrated in FIG. 3 is provided merely as an example for ease of understanding methods of optimizing similar or same such plants according to exemplary embodiments of the invention. However, the CCHP is not limited to any particular configuration, as the number and types of chillers, thermal energy storage systems, and turbines may vary, and some of these components may not be present in alternate configurations. For example, the method can be applied to a plant that includes only a heating element, only a cooling element, only a power element, or various combinations thereof.

Figure 4:
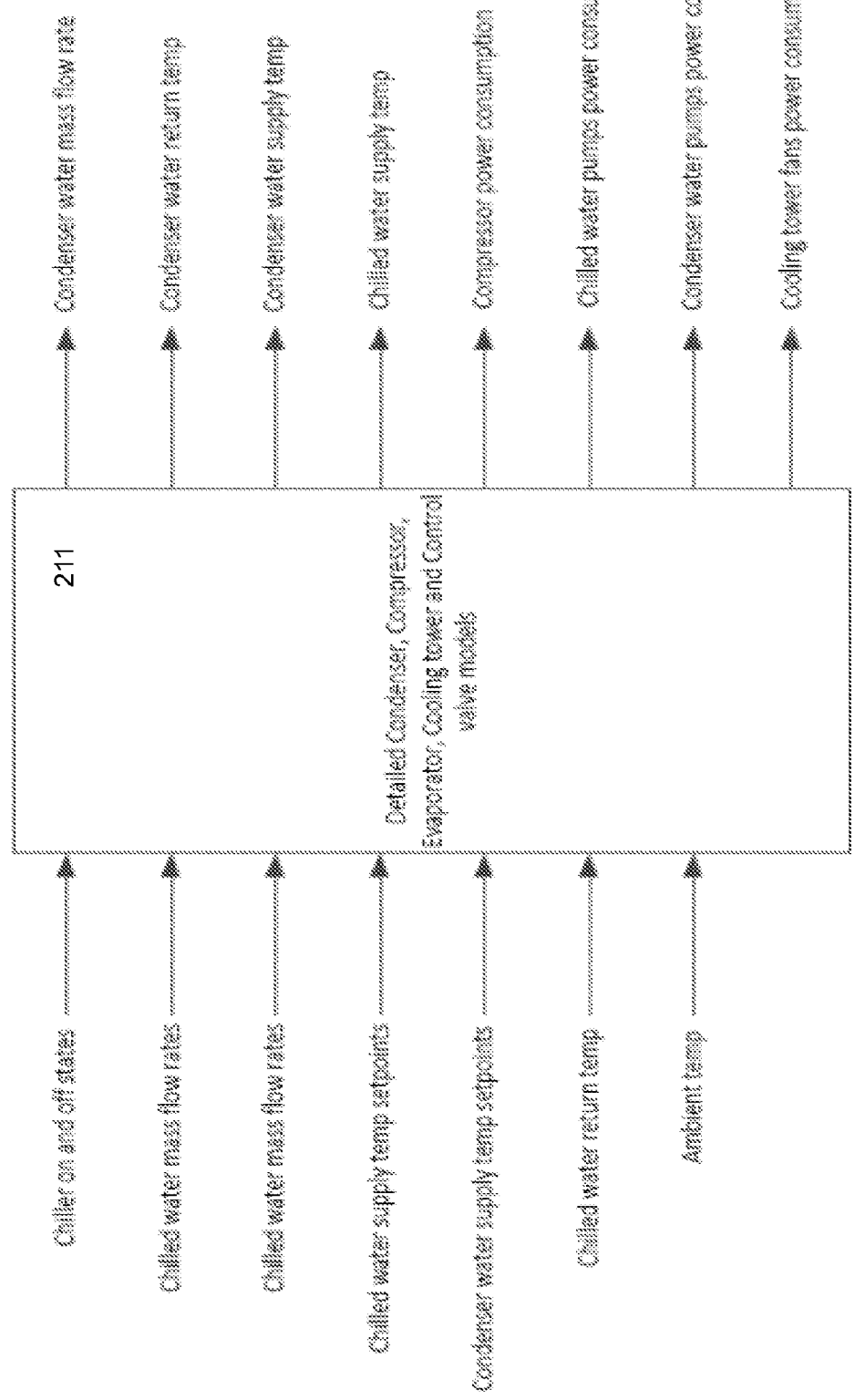
FIG. 4 illustrates an example of a complex model of a chiller.

FIG. 4 illustrates an example of a complex model of one of the chillers 211. The chiller 211 may include one or more underlying components, such as evaporators, condensers, compressors, cooling towers, and water pumps. In an exemplary embodiment of the invention, the evaporators and/or condensers are modeled using a Log Mean Temperature Difference (LMTD) approach, the compressors are modeled using a non-isentropic compression process with appropriate isentropic efficiency lookup maps, and the cooling towers are modeled using the Number of Transfer Units (NTU) framework. These models can be verified against experimental data available for the chillers 211. For example, if the coefficient of performance (COP), a chiller efficiency metric, of the experimental data matches well with predictions made by the selected model, the correct model has been chosen.

Figure 5:
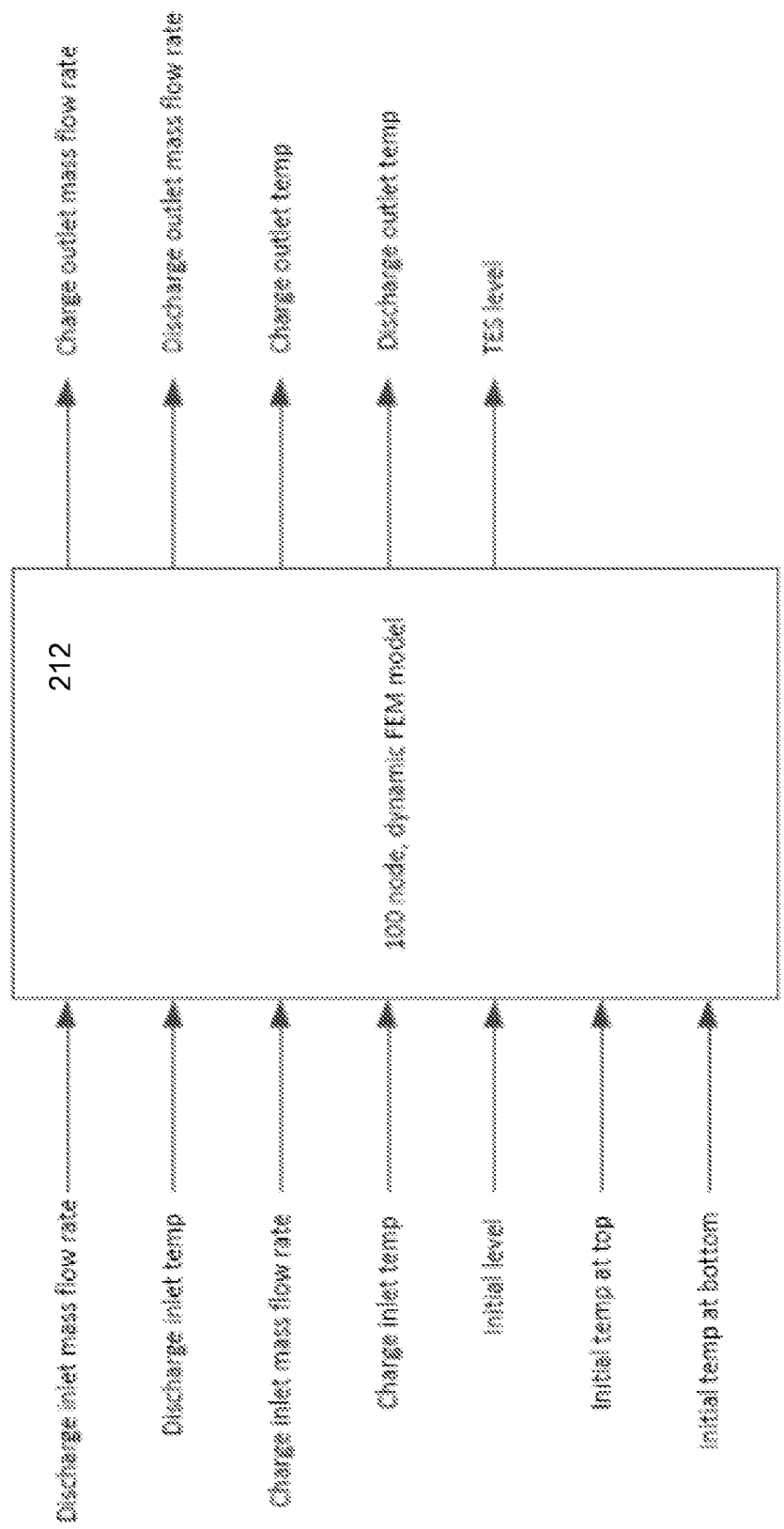
FIG. 5 illustrates an example of a complex model of a thermal energy storage tank.

FIG. 5 illustrates a complex model of the TES tank 212. The tank 212 is divided into 100 control volumes along its height, and mass and energy conservation laws are applied to each control volume. It may be assumed that the tank 212 is well-insulated from the ambient and also that at any given time, the tank 212 is either charging or discharging. In the charging mode, a portion of the supply water from the chiller system is fed into the tank 212 for storage from the bottom. In the discharging mode, cold water from the tank 212 is used to meet cooling demands. The complex model may be verified if a temperature profile generated from experimental data compares well against the temperature profile of the complex model.

Figure 6:
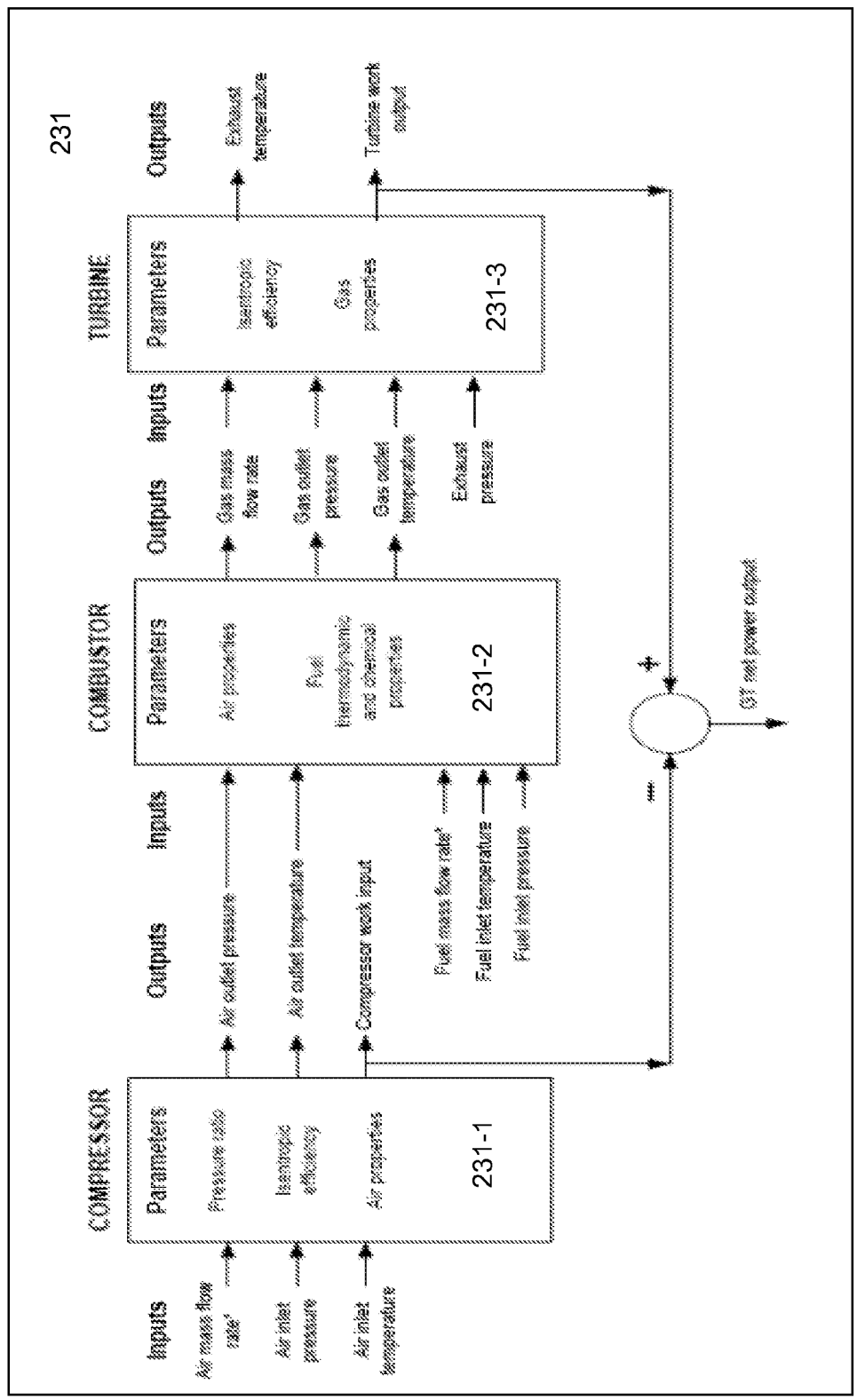
FIG. 6 illustrates an example of a complex model of a gas turbine.

FIG. 6 illustrates a complex model of a gas turbine 231. Referring to FIG. 6, the model of the gas turbine (GT) includes a compressor 231-1, a combustor 231-2, and turbine 231-3. In this example, the GT model illustrated is that of a Solar Titan™ 130 gas turbine. However, the invention is not limited to any particular GT.

Figure 7:
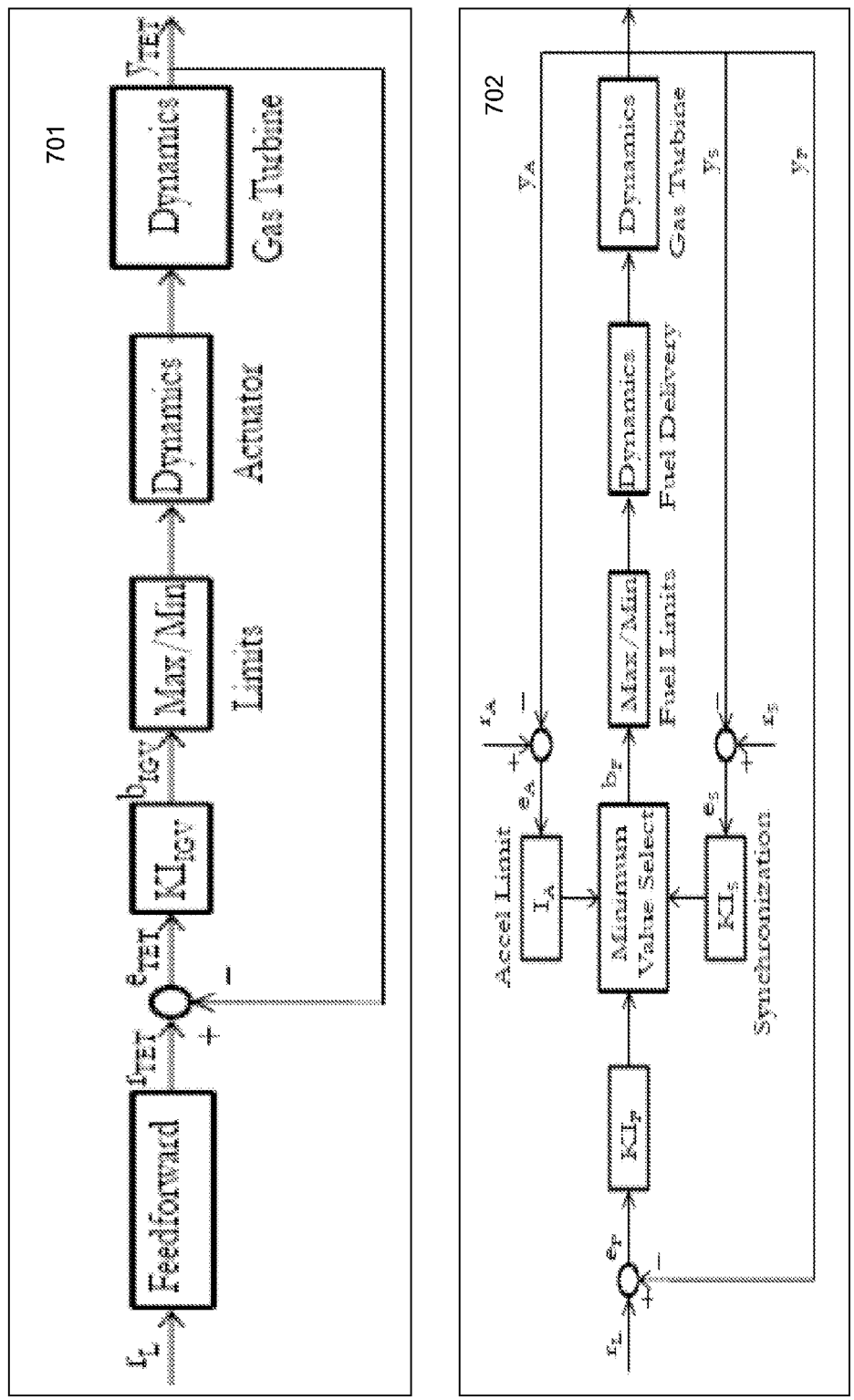
FIG. 7 illustrates closed loops of the complex model of FIG. 6.

FIG. 7 illustrates a closed loop model of FIG. 6 including a temperature controller 701 and a power controller 702 with speed and acceleration control. The controllers control Turbine Exit temperature (TET), turbine output power, shaft speed, and shaft acceleration. The GT model may be generated based on thermodynamic laws of mass and energy combustion for each underlying component (e.g., compressor 231-1, combustor 231-2, turbine 231-3, and a generator shaft) and validated using data from on-field experiments.

Once the complex models of the components of the CCHP have been identified, one or more of these complex models is replaced with simplified versions that can be more easily optimized (See block S102).

The complex model of the chiller of a cooling element 210 can be simplified if certain assumptions are made. For example, one can assume that the return water temperature $T_{CHWR,i}$ (e.g., 60 degrees Fahrenheit) and the supply water temperature $T_{CHWS,i}$ (e.g., 40 degrees Fahrenheit) of a given chiller 'i' (e.g., i=one of the numbered chillers 211) are maintained close to their design values due to the action of its control valves. When this assumption is made, the chilled water mass flow rate $m_{CHW,i}$ (e.g. kg/s) of chiller 'i' becomes the only independent variable input to the model. Thus, the amount of cooling $Q_{CHW,i}$ (KW) provided by chiller 'i' can be represented by Equation 1 as follows:

$$Q_{CHW,i} = m_{CHW,i} c_p (T_{CHWR,i} - T_{CHWS,i}) \quad (1)$$

where $c_p$ is the specific heat capacity of water (e.g., KJ/kg K).

A chiller 211 includes a compressor and a water pump. Variables of interest in the context of optimization of the chiller 211 may include the compressor power consumption $W_{comp,i}$ and the water pump power consumption $W_{CHWP}$. Using data obtained from the complex model of the chiller 211, a relationship between the compressor power consumption $W_{comp,i}$ and the amount of cooling $Q_{CHW,i}$ may be obtained by performing a regression analysis on each of chillers 211. Table 1 shows examples of these relationships for each of the chillers in the CCHP plant.

TABLE 1

| Chiller number | Compressor Power (kW) |
| --- | --- |
| 1 | $0.1357 Q_{CHW,1} + 204.91$ |
| 2 | $0.1357 Q_{CHW,2} + 204.91$ |
| 3 | $0.1716 Q_{CHW,3} + 99.453$ |
| 4 | $0.1604 Q_{CHW,4} + 686.29$ |
| 5 | $0.1213 Q_{CHW,5} + 454.94$ |
| 6 | $0.3683 Q_{CHW,6} + 151.29$ |
| 7 | $0.3127 Q_{CHW,7} + 427.63$ |

As shown in Table 1, linear expressions based on the amount of cooling provided by each chiller can be used to represent power consumption of the corresponding chiller.

Regression analysis may also be used to express the total power consumed by the water pumps, condenser water pumps, and cooling towers of the chiller. For example, an expression can be obtained to represent the power consumption of the chilled water pump $W_{CHWP}$ of a water pump of chiller 'i' by regression analysis for each of the chillers 211 as shown symbolically in Equation 2:

$$W_{CHWP} = f\left(\sum_i m_{CHWP,i}\right) \quad (2)$$

In an exemplar embodiment, a simplified model of a chiller assumes that the condenser water mass flow rate of a condenser of the chiller is controlled to be twice the chilled water flow rate to achieve a high COP. A condenser variable of interest in the context of optimization is the total power consumption of the condenser water pump $W_{CWP}$ for which a relationship of the form shown in Equation 3 may be obtained using regression:

$$W_{CWP} = f\left(\sum_i m_{CW,i}\right) \qquad (3)$$

Another variable of interest in the context of optimization is the total power consumption by the cooling tower fans $W_{CTF}$, which may be represented by the form shown in Equation 4 obtained using regression:

$$W_{CTF} = f\left(\sum_i m_{CW,i}\right) \qquad (4)$$

Figure 8:
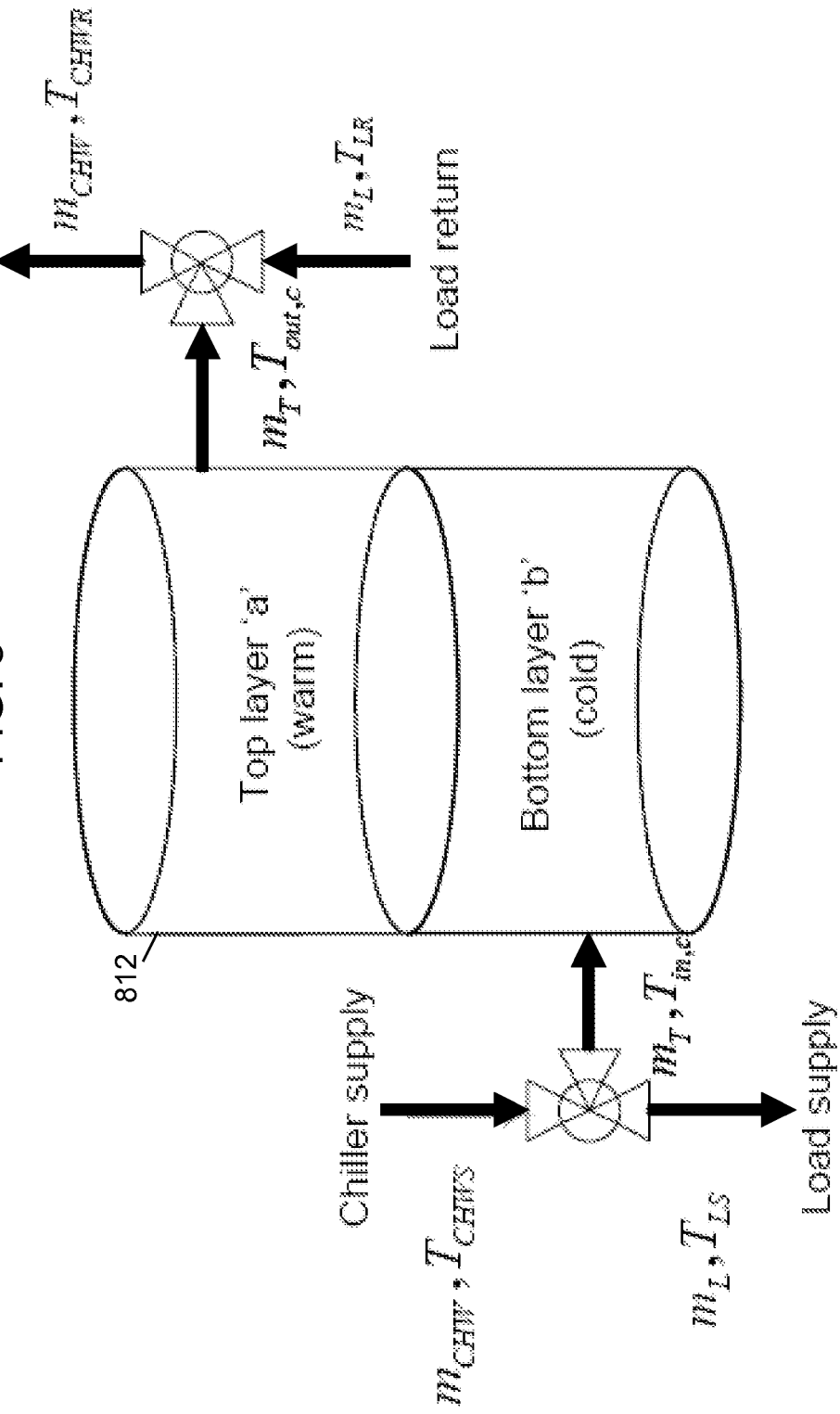
FIG. 8 illustrates a simplified model of the thermal energy storage tank in a charging mode according to an exemplary embodiment of the invention.

To generate a simplified model of TES tank 212, a two layer model 812 may be used as shown in FIG. 8. The thermodynamics of the zones (layers) can be expressed by a pair of ordinary differential equations. However, when static energy and mass conservations for the supply and return valves are considered, the overall TES tank model 812 becomes Differential Algebraic (DAE). The TES tank has binary modes of operation (e.g., charging or discharging). The charging mode of the model 812 may be represented by the below equations 5-10 as follows.

$$m_T = m_{CHW} - m_L \qquad (5)$$

$$\rho c_{pw}\frac{dT_a}{dt} = f_{a,c} m_T c_{pw}(T_b - T_a) + U_c A(T_b - T_a) \qquad (6)$$

$$\rho c_{pw}\frac{dT_b}{dt} = f_{b,c} m_T c_{pw}(T_{in,c} - T_a) + U_c A(T_a - T_b) \qquad (7)$$

$$T_{in,c} = T_{LS} = T_{CHWS} \qquad (8)$$

$$m_T T_{out,c} + m_L T_{LR} = m_{CHW} T_{CHWR} \qquad (9)$$

$$T_{out,c}(t) = T_a(t - TD_c) \qquad (10)$$

Equation 6 is an energy balance equation for the top layer 'a' of the TES tank during charging that is based on the temperatures of each layer (e.g., $T_a$ and $T_b$), a time-constant multiplier for layer 'a' during charging (e.g., $f_{a,c}$), mass flow rate through the tank $m_T$, and a heat transfer coefficient between layers 'a' and 'b' during charging (e.g., $U_c A$). Equation 7 is an energy balance equation for the bottom layer 'b' that is similar to Equation 6, but includes a temperature of inlet steam during charging ($T_{in,c}$) and a time-constant multiplier for layer 'b' during charging.

The discharging mode of the model 812 may be represented by the below equations 11-16.

$$m_T = m_L - m_{CHW} \qquad (11)$$

$$\rho c_{pw}\frac{dT_a}{dt} = f_{a,d} m_T c_{pw}(T_{in,d} - T_a) + U_d A(T_b - T_a) \qquad (12)$$

$$\rho c_{pw}\frac{dT_b}{dt} = f_{b,d} m_T c_{pw}(T_a - T_b) + U_d A(T_a - T_b) \qquad (13)$$

$$m_T T_{out,d} + m_{CHW} T_{CHWS} = m_L T_{LS} \qquad (14)$$

$$T_{in,d} = T_{CHWR} = T_{LR} \qquad (15)$$

$$T_{out,d}(t) = T_b(t - TD_d) \qquad (16)$$

Equation 12 is an energy balance equation for the top layer 'a' of the TES tank during discharging that is similar to equation 6. Equation 13 is an energy balance equation for the bottom layer 'b' during discharging that is similar to equation 7.

As shown by constraints 10 and 16, the temperature of outlet steam during charging is based on the temperature of the top layer 'a' and a time-delay, and the temperature of the outlet steam during discharging is based on the temperature of the bottom layer 'b' and another time-delay.

In at least one embodiment of the invention, the time-delays are strongly dependent on the mass flow rate $m_T$ through the TES (e.g., the water mass flow rate in and out of a TES tank, kg/sec). In one embodiment, these time delays can be obtained by regression analysis as shown by equations 17 and 18, respectively, as follows:

$$DT_c = \frac{10^7}{15.718 m_T + 1781.5} \qquad (17)$$

$$DT_d = \frac{10^7}{16.911 m_T + 332.82} \qquad (18)$$

In at least one embodiment, the TES tank model 812 includes parameters $f_{a,c}$ (e.g., time constant multiplier for layer 'a' for dynamics during charging), $f_{b,c}$ (e.g., time constant multiplier for layer 'b' for dynamics during charging), $f_{a,d}$ (e.g., time constant multiplier for layer 'a' for dynamics during discharging), $f_{b,d}$ (e.g., time constant multiplier for layer 'b' for dynamics during discharging), $U_c$ (e.g., heat transfer coefficient between layer 'a' and 'b' during charging, and $U_d$ (e.g., heat transfer coefficient between layer 'a' and 'b' during discharging).

These parameters are to be calibrated so that the predictions of the simplified and detailed models match closely, which may be expressed by equations 19 and 20 using a least-squares optimization.

$$\{f_{a,c}, f_{b,c}, U_c\} = \mathrm{argmin}\sum_k \left(T_{out,c}(k) - \hat{T}_{out,c}(k)\right)^2 \qquad (19)$$

$$\{f_{a,d}, f_{b,d}, U_d\} = \mathrm{argmin}\sum_k \left(T_{out,d}(k) - \hat{T}_{out,d}(k)\right)^2 \qquad (20)$$

In exemplary embodiment of the invention, discretized forms of equations (5)-(18) serve as constraints for the optimization problems expressed in equations (19) and (20) and a simulated annealing based algorithm is used to determine the global minima. Exemplary parameters that may be obtained after averaging results from optimization runs over a range inputs using such an algorithm are shown in Table 2 below.

TABLE 2

| Parameter | Value |
| --- | --- |
| $f_{a,c}$ | 1.739 |
| $f_{b,c}$ | 2.222 |
| $f_{a,d}$ | 4.138 |
| $f_{b,d}$ | 1.599 |
| $U_c$ | 0.0283 (kW/m²-K) |
| $U_d$ | 0.0197 (kW/m²-K) |

In an exemplary embodiment of the invention, a detailed closed loop gas turbine (GT) model (e.g., see FIG. 6 and FIG. 7) is used to develop regression based static relationships (e.g., equations 21-23) between selected GT inputs and outputs, which are relevant from an optimization perspective. The input variable is $W_{GT}$, the desired electrical power produced by the GT, and the output variables of interest are the natural gas mass flow rate $m_f$, exhaust gas mass flow rate $m_g$, and the Turbine Exit Temperature TET of the exhaust gas.

$$m_f = 0.0447 W_{GT} + 0.2287 \quad (21)$$

$$m_g = 0.2128 W_{GT}^2 - 1.8986 W_{GT} + 40.479 \quad (22)$$

$$TET = 0.06927 W_{GT}^4 - 2.126 W_{GT}^3 + 19.145 W_{GT}^2 - 31.57 W_{GT} + 636.27 \quad (23)$$

As shown above, each of parameters $m_f$, $m_g$, and TET are represented by polynomials that include a term having the desired electrical power of the GT $W_{GT}$. The parameter $m_f$ is a first order polynomial, the parameter $m_g$ is a $2^{nd}$ order polynomial, and the parameter TET is a fourth order polynomial. However, the above is merely an example of one type of gas turbine, as the polynomials may differ when a gas turbine of a different type is used.

Figure 9:
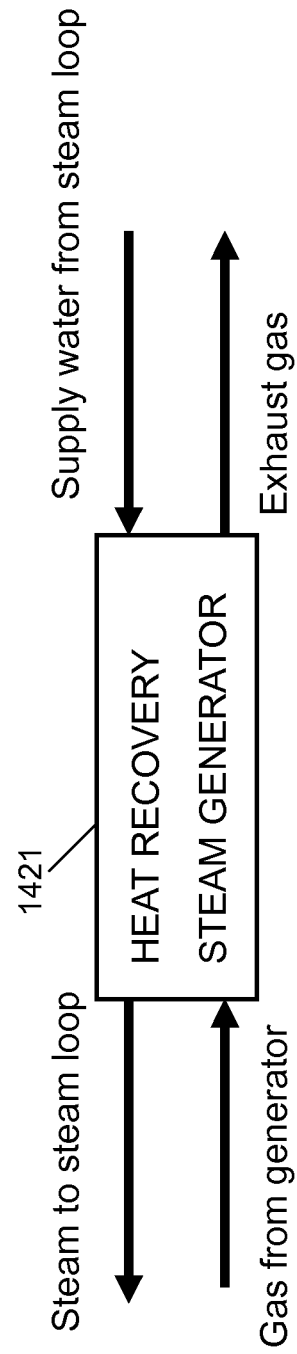
FIG. 9 illustrates a simplified model of a heat recover steam generator according to an exemplary embodiment of the invention.

FIG. 9 illustrates an HRSG 1421, which may include multiple components such as boilers, a superheater, steam drum, etc., but which is modeled as a lumped, counter-flow heat exchanger. In a further embodiment of the simplified model, the following assumptions are made: 1) there is no pressure drop in the gas stream from inlet to outlet (e.g., $P_{w,out} = P_{w,in}$), 2) pressure drops by a constant factor ($f_{p,w}^{SG}$) in the steam/water stream, and 3) the saturation temperature ($T_{w,sat}$) and specific enthalpy of vaporization ($h_{fg}$) for water are linearly dependent on the saturation pressure ($P_{w,sat}$) in the operating range of the HRSG 1421. Equations 24 and 25 represent the saturation temperature ($T_{w,sat}$) and the specific enthalpy of vaporization ($h_{fg}$), respectively.

$$T_{w,sat} = \theta_{T,1} P_{w,sat} + \theta_{T,2} \quad (24)$$

$$h_{fg} = \theta_{h,1} P_{w,sat} + \theta_{h,2} \quad (25)$$

The above $2^{nd}$ assumption results in the equation 26 as follows:

$$P_{w,sat} = f_{p,w}^{SG} P_{w,in} \quad (26)$$

where the parameter $P_{w,out}$ is the pressure of steam at the output of the HRSG 1421 and the parameter $P_{w,in}$ is the pressure of water at its inlet.

Using a definition of heat exchanger effectiveness, equation 27 can be obtained as follows:

$$TET - T_{g,out} = \epsilon(TET - T_{w,in}) \quad (27)$$

In an exemplary embodiment, the steam generator potential $\phi$ of the HRSG 1421 is defined as $m_g(TET - T_{g,out})/m_w$ where $m_w$ is the mass flow rate of water into the HRSG in kg/s. When $\phi$ is $<c_{pw}(T_{w,sat})$, not enough thermodynamic potential exists for steam generation. When $c_{pw}(T_{w,in} - T_{w,sat}) \leq \phi \leq c_{pw}(T_{w,in} - T_{w,sat}) + h_{fg}$, steam in the saturated state is generated such that $T_{w,out} = T_{w,sat}$. When $\phi \geq c_{pw}(T_{w,in} - T_{w,sat}) + h_{fg}$, steam in the superheated state is generated according to equation 28 below.

$$T_{w,out} = T_{w,sat} + \frac{1}{c_{ps}}(\phi - c_{pw}(T_{w,in} - T_{w,sat}) + h_{fg}) \quad (28)$$

Figure 10:
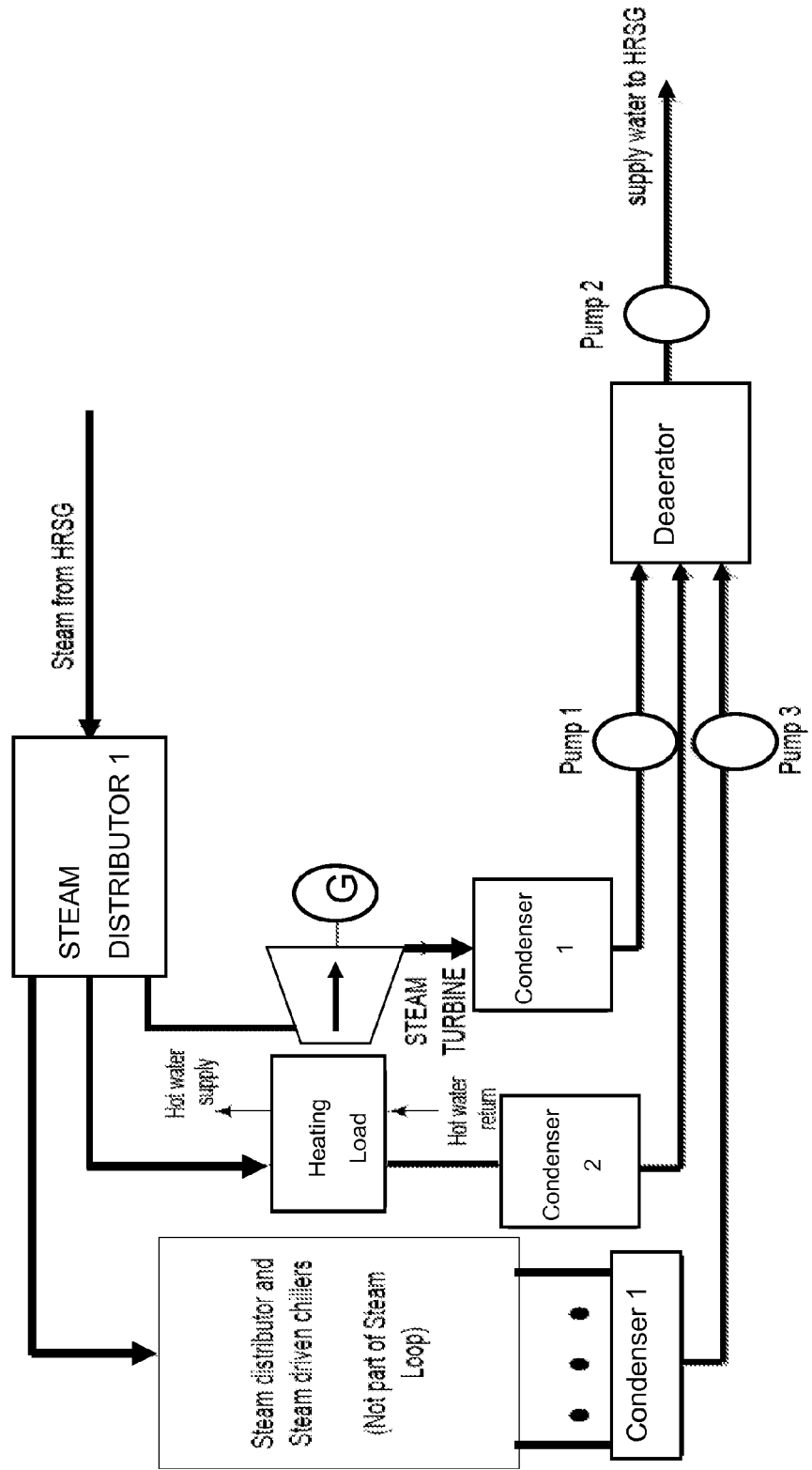
FIG. 10 illustrates an example of steam loop.

A schematic layout of a steam loop of the steam turbine 232 is illustrated in FIG. 10. A simplified model of the steam loop can be generated based on the assumptions: i) the deaerator and condensers are maintained at constant pressures, ii) the pressure and temperature of water exiting the steam loop is constant, iii) the steam driving a turbine of the steam turbine behaves like an ideal gas, and iv) the mass flow rate of steam in the steam loop is proportional of the fuel mass flow rate in the GT. In a further embodiment, it may be assumed that the ratio of steam used for driving the turbine, to that used for heating is constant at all times.

The above assumptions result in the following equations 29-33, which represent the simplified model of the steam loop.

$$m_{w1} = f_1^w m_w \quad (29)$$

$$m_{w,2} = (1 - f_1^w) m_w \quad (30)$$

$$W_{p,1} = \frac{m_{w1}}{\rho}(P_{dae} - P_{cond,1}) \quad (31)$$

$$W_{p,2} = \frac{m_w}{\rho}(P_{w,in} - P_{dae}) \quad (32)$$

$$W_{ST} = \frac{1}{1000} m_{w1} c_{ps} \eta_{ST} T_{w,out}\left(1 - \left(\frac{P_{cond,1}}{P_{w,out}}\right)^{0.25}\right) \quad (33)$$

where $m_{w1}$ is mass flow rate of steam diverted to generate power from steam turbine, $m_{w2}$ is mass flow rate of steam diverted to meet heating demand, $f_1^w$ is a fraction of total mass of steam diverted to generate power from a steam turbine, $m_w$ is mass flow rate of steam/water, $P_{dae}$ is the pressure at which the deaerator is maintained, $P_{cond,1}$ is the pressure at which condenser 1 is maintained, $W_{p1}$ is power consumption by pump 1, and $W_{p2}$ is power consumption of pump 2, $W_{ST}$ is the power produced by the steam turbine, $c_{ps}$ is the specific heat capacity of steam, and $\eta_{ST}$ is the isentropic efficiency of the steam turbine. In at least one embodiment of the invention, the following constraint (equation 34) is imposed for ensuring that the desired heating demand is met at all times as follows:

$$Q_H(t) \leq Q_{h,max}(t) = m_{w2}(T_{w,out} - T_{HWR}) \quad (34)$$

where $Q_H(t)$ is desired heating demand from the cogenerated steam at time t, $Q_{H,max}(t)$ is the maximum heat that can be produced by the cogenerated steam and $T_{HWR}$ is the hot water return temperature after serving the heating demand.

Once the simplified models of the underlying elements of the CCHP plant have been obtained, the method continues to block S102 to perform an optimization using these models as constraints to determine decision variables that can be used to adjust settings or controls within the actual plant.

This optimization may be referred to as a centralized supervisory optimization. The objective of this optimization is to determine, in advance, the optimal values of the plant inputs such that the total plant operating cost over a period of time (e.g., 24 hours) is minimized. The results of the optimization serve as set-points, which can be used by lower level feedback controllers, actuators, or valves such as a GT inlet valve, a chiller control valve, etc.

The optimization includes generation of an objective function that is to be minimized. Equation 35 shows an example of the objective function as follows:

$$J = \sum_{k=1}^{24} \left( \underbrace{1000 c_{grid}(k) W_{grid}(k)}_{\text{Grid electricity cost}} + \underbrace{c_{fuel}(k) m_f(k)}_{\text{Fuel cost}} \right) \quad (35)$$

where $c_{grid}$ is the price of power purchased from a grid and sampled every hour (e.g., \$/KW), $W_{grid}$ is the power purchased from the grid every hour (e.g., kW), $c_{fuel}$ is the price of fuel (\$/kg), and $m_f$ is the mass flow rate of the fuel (kg/s) which is typically natural gas.

In addition to the component level constraints defined by the simplified models presented above, in at least one embodiment of the invention, the optimization includes imposing certain demand and/or capacity constraints. Examples of the demand constraints are shown below by equations 36-37 as follows:

$$\sum_{i=1}^{7} Q_{CHW,i}(k) = 1000 Q_{cooling}(k) \quad (36)$$

$$\underbrace{W_{grid}(k)}_{\text{Grid power purchased}} + \underbrace{W_{GT}(k)}_{\text{GT power produced}} + \underbrace{W_{ST}(k)}_{\text{ST power produced}} = \quad (37)$$

$$\underbrace{W_{elec}(k)}_{\text{Campus power demand}} + \underbrace{\frac{1}{1000}(W_{p1}(k) + W_{p2}(k))}_{\text{Steam loop power consumption}} +$$

$$\underbrace{\frac{1}{1000}\left( W_{CHWP}(k) + W_{CWP}(k) + W_{CTF}(k) + \sum_i W_{comp,i}(k) \right)}_{\text{Chiller bank power consumption}}$$

where $Q_{cooling}$ is the forecasted hourly cooling demand (e.g., kW).

The capacity constraint may be imposed by the utility company providing the electricity. For example, the utility company could mandate that at least 1 MW of electricity be purchased periodically from the grid to stay in service.

The optimization can generate various decision variables such as the chilled water mass flow rate from each chiller $m_{CHW,i}(k)$, the total chilled water supply of the plant $m_L(k)$, the chilled water supply temperature from each chiller $T_{CHWS}(k)$, the temperature of a return water stream $T_{LR}(k)$, the operating power level of the GT $W_{GT}(k)$, and the power purchased from the grid $W_{grid}(k)$, where k=1, 2, . . . , 24 (e.g., for each hour of the day).

Since the charging/discharging mode of a TES of the simplified model may depend on the sign of $$\sum_i m_{CHW,i}(k) - m_L(k),$$

the optimization also determines at what time instances in the future does the tank need to be charged or discharged. In another embodiment, the initial TES tank state (e.g., water temperature of the two layers) is an input to the optimization.

At least one embodiment of the invention presents a novel application of various static and dynamic modeling tools (such as non-linear regression, global optimization and physics based modeling) to develop reduced order models of various CCHP components. The methodology is claimed to be generalizable in the sense that it would be applicable to most CCHP systems which have power production, energy storage and heat recovery features.

Figure 11:
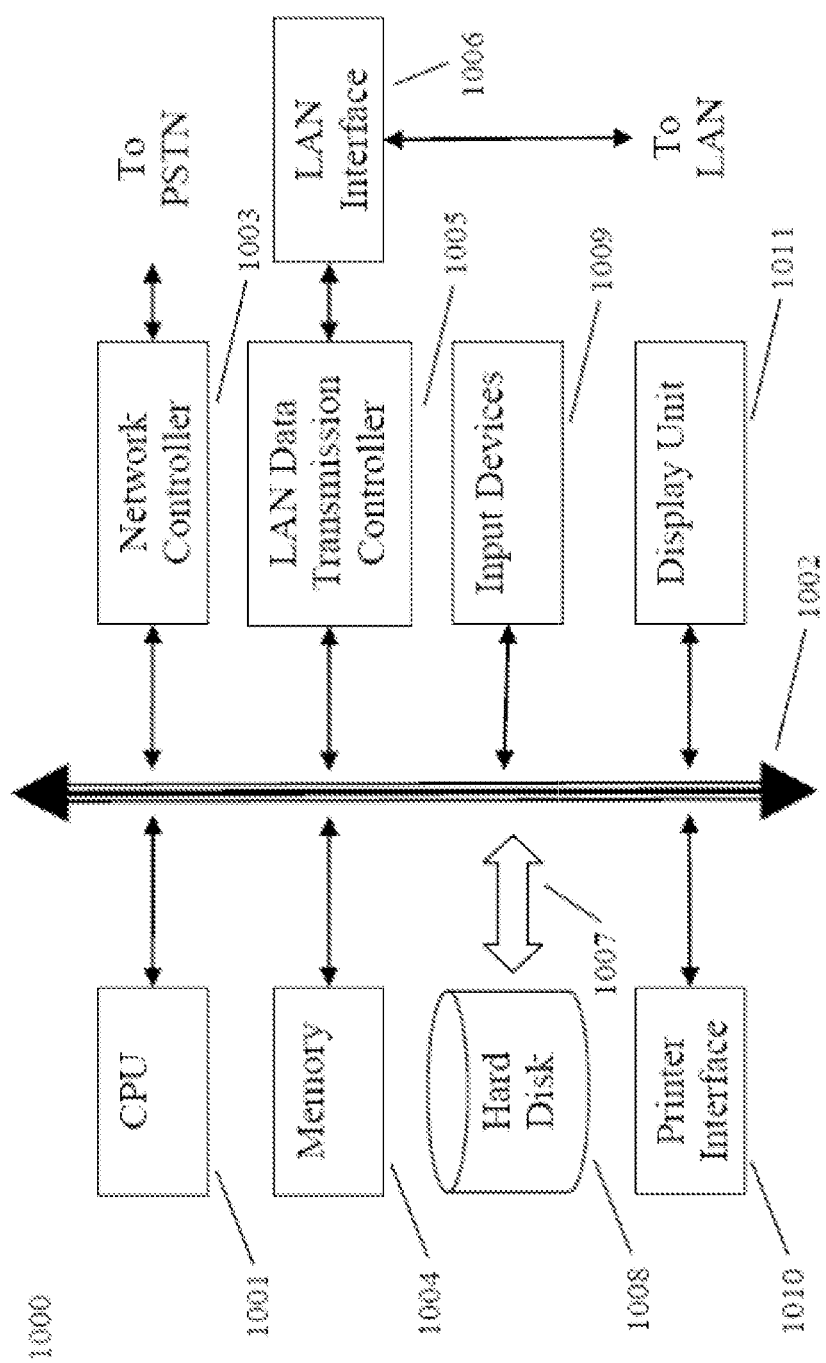
FIG. 11 illustrates an example of a computer system capable of implementing methods and systems according to embodiments of the present invention.

FIG. 11 shows an example of a computer system, which may implement the methods and systems of the present disclosure. The system and methods of the present disclosure, or part of the system and methods, may be implemented in the form of a software application running on a computer system, for example, a mainframe, personal computer (PC), handheld computer, server, etc. For example, the method of FIG. 1 may be implemented as software application(s). These software applications may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, a GPU (not shown), a random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. CPU 1001 may be the computer processor that performs some or all of the steps of the methods described above with reference to FIGS. 1-10.

In exemplary embodiment of the invention, the output decision variables are stored within a computer message for output across network 1002 to a computer system of the plant. The computer system of the plant, in response to the computer message may be configured to automatically adjust controls of the plant in view of the received output decision variables. For example, one of the decision variables could indicate the time at which water of the TES tank is to be charged or discharged and the control of the plant could be a timer that is automatically set by the received time. The optimization methods could be performed periodically and then the control would be re-adjusted each time the method is performed. This differs from a rule-based approach which uses the same rule no matter how conditions within the plant or demand forecasts have changed over time. Thus, embodiments of the invention are dynamic in nature, and allow for more efficient and cost effective management of a plant.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method to manage operating costs of a combined cooling heating and power (CCHP) plant, the method comprising:

converting, by a processor, complex models of underlying components of the plant into simplified models;

performing, by the processor, an optimization that uses the simplified models as constraints of the optimization to output decision variables; and adjusting, by the processor, controls of the plant based on one or more of the output decision variables;

wherein one of the simplified models of a thermal energy storage of the plant is a two layer model of the tank and the simplified model of the tank includes first constraints representative of a charging mode of the tank and second constraints representative of a discharging mode of the tank.

2. The method of claim 1, wherein return and supply water temperatures of a chiller of the plant are held constant in one of the simplified models that represent a chiller of the plant.

3. The method of claim 2, wherein conversion into the simplified model of the chiller comprises:

generating a polynomial representative of a power requirement of the chiller using the amount of cooling and one or more coefficients; and performing a linear regression on the polynomial to determine values of the coefficients.

4. The method of claim 1, wherein the first set of constraints include a charging temperature of the tank based on a temperature of the first layer and the second set of constraints include a discharging temperature of the tank based on a temperature of the second layer.

5. The method of claim 4, wherein the charging and discharging temperatures are based on time delays determined by mass flow rates in and out of the tank, respectively.

6. The method of claim 5, wherein conversion into the simplified model of the tank comprises:

performing a global optimization based on the charging temperature subject to the first set of constraints; and performing a global optimization based on the discharging temperature subject to the second set of constraints.

7. The method of claim 1, wherein one of the simplified models represents a gas turbine of the plant and is a polynomial based on a desired electrical power produced by the gas turbine.

8. The method of claim 7, wherein the polynomial represents one of a fuel consumption rate, an exhaust flow rate, or a turbine exit temperature of the gas turbine.

9. The method of claim 1, wherein one of the simplified models represents a heat recovery steam generator (HRSG) that is modeled as a lumped, counter-flow heat exchanger.

10. The method of claim 9, wherein the simplified model of the HRSG includes constraints of i) there is no pressure drop from inlet to outlet of the HRSG, ii) pressure drops by a constant factor within the HRSG, and iii) a saturation temperature and specific enthalpy of vaporization for water are linearly dependent on a saturation pressure in an operating range of the HRSG.

11. The method of claim 1, wherein one of the simplified models represents a steam loop of the plant that comprises a steam turbine, the simplified model including constraints that i) a deaerator and condenser operate at constant pressures, ii) pressure and temperature of water exiting and entering the steam loop are constant, iii) steam driving the steam turbine behaves like an ideal gas, and iv) a mass flow rate of steam in the loop is proportional to a fuel mass flow rate in a gas turbine supplying exhaust to the steam turbine.

12. The method of claim 1, wherein performing the optimization comprises:

minimizing an objective function including a summation of a term representative of grid electricity cost and a term representative of a fuel cost; and using the simplified models as constraints in the minimization.

13. The method of claim 12, wherein data for the terms are sampled during at least two consecutive periods of time.

14. The method of claim 1, where the decision variables include at least one of water mass flow rate of chilled water, total chilled water supply, chilled water supply temperature, temperature of return stream, operating power level of a gas turbine, and an amount of power purchased.

15. A computer readable storage medium embodying instructions executable by a processor to perform method steps for managing operating costs of a combined cooling heating and power (CCHP) plant, the method steps comprising instructions for:

converting complex models of underlying components of the plant into simplified models;

performing an optimization that uses the simplified models as constraints of the optimization to output at least one decision variable; and adjusting controllers of the plant based on one or more of the output decision variables, wherein one of the simplified models of a thermal energy storage tank of the plant is a two layer model of the tank and the simplified model of the tank includes first constraints representative of a charging mode of the tank and second constraints representative of a discharging mode of the tank.

16. A Combined Cooling Heating Power (CCHP) Plant comprising:

a cooling element;

a heating element;

a power supplying element; and a computer comprising a memory including a program, and a processor configured to execute the program, wherein the program comprises instructions to convert complex models of underlying components of the elements into simplified models, perform an optimization that uses the simplified models as constraints of the optimization to output decision variables, and adjust controls of at least one of the elements of the Plant based on one or more of the output decision variables and wherein one of the simplified models of the cooling element is a thermal energy storage tank modeled as two layers, the simplified model of the tank including first constraints representative of a charging mode of the tank and second constraints representative of a discharging mode of the tank.

17. The CCHP Plant of claim 16, wherein the cooling element includes at least one chiller, the heating element comprises a heat recovery steam generator, and the power element comprises a gas turbine or a steam turbine.

18. The CCHP Plant of claim 16, wherein return and supply water temperatures of a chiller of the Plant are held constant in one of the simplified models that represent the corresponding chiller.

19. The CCHP Plant of claim 16, wherein the program is configured to convert one of the complex models of a chiller of the cooling element into a simplified model of the chiller by generating a polynomial representative of a power requirement of the chiller using an amount of cooling and one or more coefficients, and performing a linear regression on the polynomial to determine values of the coefficients.

20. The CCHP Plant of claim 16, wherein the first set of constraints include a charging temperature of the tank based on a temperature of the first layer and the second set of constraints include a discharging temperature of the tank based on a temperature of the second layer.

21. The CCHP Plant of claim 20, wherein the charging and discharging temperatures are based on time delays determined by mass flow rates in and out of the tank, respectively.

22. The CCHP Plant of claim 21, wherein the program is configured to convert one of the complex models of the tank into the simplified model by performing a global optimization based on the charging temperature subject to the first set of constraint, and performing a global optimization based on the discharging temperature subject to the second set of constraints.

23. The CCHP Plant of claim 16, wherein one of the simplified models of the power supplying element represents a gas turbine and is a polynomial based on a desired electrical power produced by the gas turbine.

24. The CCHP Plant of claim 16, wherein one of the simplified models of the heating element represents a heat recovery steam generator (HRSG) that is modeled as a lumped, counter-flow heat exchanger.

25. The CCHP Plant of claim 16, wherein one of the simplified models of the heating element represents a steam loop that comprises a steam turbine, the simplified model including constraints that i) a deaerator and condenser operate at constant pressures, ii) pressure and temperature of water exiting and entering the steam loop are constant, iii) steam driving the steam turbine behaves like an ideal gas, and iv) a mass flow rate of steam in the loop is proportional to a fuel mass flow rate in a gas turbine supplying exhaust to the steam turbine.

26. The CCHP Plant of claim 16, wherein the program performs the optimization by minimizing an objective function including a summation of a term representative of grid electricity cost and a term representative of a fuel cost and using the simplified models as constraints in the minimization.

* * * * *